United States Patent [19]
Eggert

[11] 3,901,637
[45] Aug. 26, 1975

[54] APPARATUS FOR TAIL REMOVAL IN BLOW MOLDING MACHINES

[75] Inventor: Noel B. Eggert, Toledo, Ohio

[73] Assignee: Owens-Illinois, Inc., Toledo, Ohio

[22] Filed: Dec. 17, 1973

[21] Appl. No.: 425,317

[52] U.S. Cl...... 425/387 B; 425/806; 425/DIG. 206
[51] Int. Cl............................................ B29d 23/03
[58] Field of Search ... 425/387 B, DIG. 206, 326 B, 425/806, 212; 214/1 BB; 225/101, 106; 294/88, 106

[56] References Cited
UNITED STATES PATENTS

| | | | |
|---|---|---|---|
| 2,890,483 | 6/1959 | Soubier | 425/DIG. 206 X |
| 3,172,152 | 3/1965 | Uhlig | 425/806 X |
| 3,781,395 | 12/1973 | Uhlig | 425/326 B |
| 3,806,587 | 4/1974 | Turner | 425/DIG. 206 X |

*Primary Examiner*—Francis S. Husar
*Assistant Examiner*—David S. Safran
*Attorney, Agent, or Firm*—Philip M. Rice; E. J. Holler

[57] ABSTRACT

An apparatus for the removal of the "tail" or pinched waste portion formed when a tubular parison is pinched shut by the closing of cooperable blow mold sections on the tube to form a blowable shape in the closed blow mold sections. The apparatus includes tail grippers mounted on the respective blow mold sections for opening and closing movement with the sections and engageable with the tail exteriorly of the sections. The grippers are each supported on swinging links for over-center arcuate movement, and the grippers are actuated for such arcuate movement while the mold sections remain closed to thereby remove the tail. The over-center arcuate movement of the grippers maintains and even increases gripper-tail contact during tail removal, and then causes the grippers to separate to release the tail after removal. A simple, yet effective, stop and biasing arrangement is provided to accomodate the over-center gripper movement.

9 Claims, 5 Drawing Figures

3,901,637

APPARATUS FOR TAIL REMOVAL IN BLOW MOLDING MACHINES

BACKGROUND OF THE INVENTION

In the manufacture of containers for the retention of liquids, there are various techniques known to obtain a finished container from a plasticized material. One well-known technique includes the extrusion of a tubular parison of plasticized material from an orifice, closing two opposed blow mold sections on the tubular parison to pinch shut the bottom of the parison, and subsequently blow molding the parison into the shape of the final container.

In the aforementioned technique, the pinching shut of the tubular parison by the blow mold sections creates an excess of plasticized material exteriorly of the blow mold sections. This material is referred to as the tail. Obviously, the tail should be removed to provide a clean finished container.

It is known to provide a tail pulling apparatus to remove the tail from the extruded parison after the parison has been pinched shut within a blow mold. However, certain problems arise with the prior tail pulling equipment.

For example, as the tail of plasticized material cools in temperature from the initially hot plasticized material to room temperature, the plasticized material will shrink. The shrinking of the tail causes the prior tail pulling machines to lose their grip on the tail and, as a result, the tail is not always fully and cleanly removed.

Another problem in the prior tail pulling apparatus is that if the thickness of the parison or position of the blow mold section, or both, changes, a manual adjustment is necessary so that the tail is properly gripped by the tail puller.

However, prior to the present invention, there was no satisfactory apparatus for automatically adjusting for variations in the thickness of the tail, including those variations caused by cooling and shrinkage, for variations in mold section positioning and in parison thickness, to insure that the tail is cleanly severed from the parison.

BRIEF DESCRIPTION OF THE PRESENT INVENTION

The present invention now provides an improved tail puller apparatus for use with the laterally movable blow mold sections which define a blow mold cavity therebetween. The tail pulling apparatus of the present invention is automatically self-adjusting to provide and maintain a strong grip on the tail, regardless of the shrinkage in the tail, until the tail is cleanly and completely severed from the parison.

The apparatus of the present invention includes a bracket mounted for lateral movement with the blow mold sections and an actuator mounted on the bracket. A carrier head is rigidly mounted to the actuator, and opposed tail gripping elements are mounted on the carrier head and resiliently urged toward the plane of the tail. The tail gripping elements are each guided on connecting links each having a first end pin connected to the bracket and a second end pin connected to the carrier head. Upon actuation of the apparatus to remove the tail, the actuator moves the carrier head and tail gripping elements along an over-center arcuate path away from the tubular parison. The apparatus guides the tail grippers along a multiple stage path including a first stage during which the elements move toward one another and away from the blow mold sections, and a second stage during which the tail grippers move away from one another and away from the blow mold sections.

Additionally, means are provided to position the tail gripping elements to engage the tail and to accomodate the over-center arcuate movement of the grippers. Specifically, the opposed tail gripping elements are resiliently urged by a spring toward the plane of the tail, and the carrier includes a stop to limit pivotal movement of the tail gripping elements caused by urging of the spring.

The carrier is pin connected to each tail gripping element about a first axis parallel to the plane of the tail. The carrier is threaded onto the actuating means, such as a hydraulic cylinder, and the carrier is also pin connected to the connecting link about a second axis also parallel to the plane of the tail.

OBJECTS

It is, therefore, an important object of the present invention to provide a tail pulling apparatus which automatically adjusts for variations in the thickness of the tail due to shrinkage and due to initially different thicknesses of the tubular parison.

Another important object of the present invention is the provision of an apparatus for removing the tail from a pinched parison cleanly and completely.

A further important object of this invention is the provision of an apparatus for automatically removing the tail from a parison which has been pinched shut by laterally movable blow mold sections, including opposed tail gripping elements resiliently urged into contact with the tail of a pinched parison and maintained in such contact until the tail is severed from the parison.

Yet another important object of the present invention is the provision of an apparatus for the removal of a tail from a pinched tubular parison, the apparatus including opposed tail gripping elements resiliently mounted on a carrier head, the carrier head mounted on an actutator for movement away from the tubular parison. The apparatus includes solid links for guiding the gripper elements through an over-center arcuate path which is constantly away from the tubular parison, the path initially toward the opposed gripper until the tail is severed from the parison, and subsequently away from the opposed gripper so that the tail is dropped clear of the apparatus.

Yet another important object of the present invention is the provision of an apparatus for removing the tail from a tubular parison which has been pinched shut between opposed blow mold sections, the apparatus comprising opposed tail gripping means to engage the tail therebetween, a bracket carried by the blow mold sections, actuating means secured to the bracket for moving the tail gripping means, and a link having a first end pin connected to the bracket and a second end pin connected to the tail pulling element for guiding each gripper through an over-center arcuate path.

Still another important object of the present invention is the provision of an apparatus for cleanly and completely removing the tail formed by the closure of opposed blow mold sections upon a tubular parison, including opposed tail pulling elements resiliently urged toward the tail for engaging the tail and means for moving the tail pulling elements along a multistage path having a first stage toward the opposed tail pulling element and away from the blow mold sections, and a second stage away from both the opposed tail pulling elements and the blow mold sections.

Yet still another important object of the present invention is the provision of an apparatus for the removal of the tail formed by the closing of opposed blow mold sections on a tubular parison, including opposed tail gripper elements each supported on pivoted links for over-center arcuate movement to maintain and increase contact between the gripper elements and the tail during tail removal, and to then separate the gripper elements to release the removed tail, each gripper being resiliently biased away from a stop and toward the opposed gripper to accommodate the over-center arcuate movement.

IN THE DRAWINGS

In the drawings, wherein like reference numerals identify corresponding elements:

AS SHOWN IN THE DRAWINGS

Figure 1:
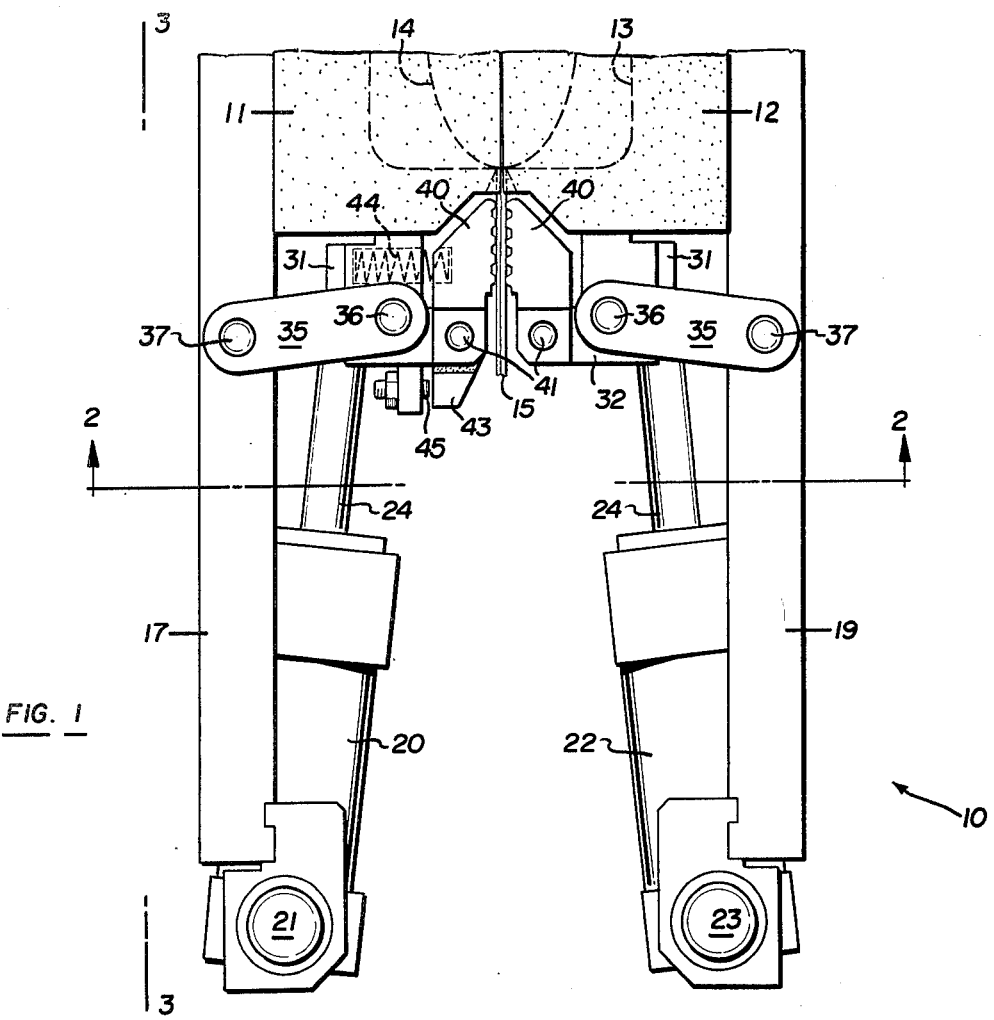
FIG. 1 is a front elevation view of the apparatus of the present invention illustrating the tail gripping elements in contact with a tail.
Figure 2:
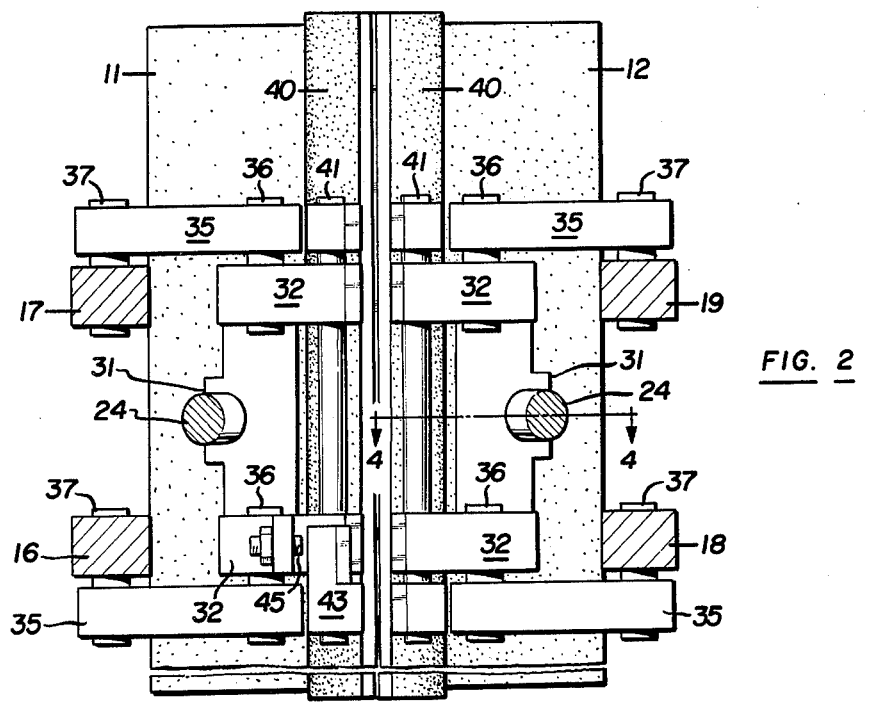
FIG. 2 is an elevation view of the apparatus of FIG. 1 as seen in the plane of the arrows 2—2 of FIG. 1.
Figure 3:
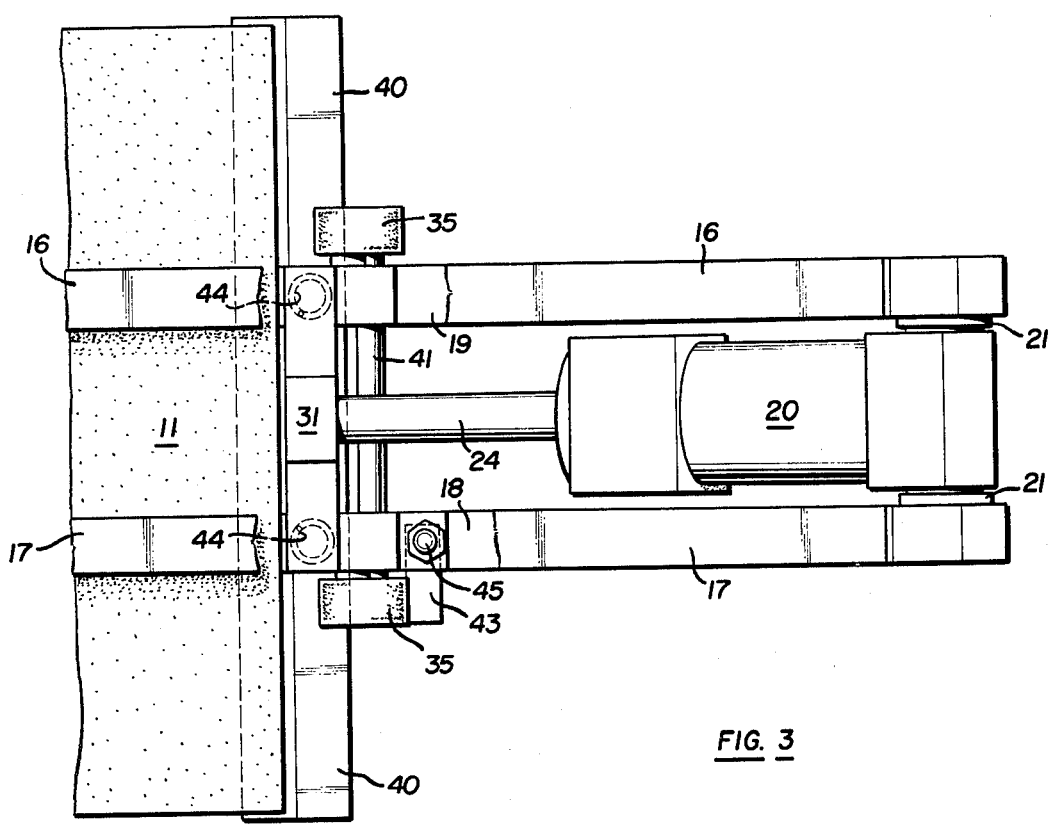
FIG. 3 is a side elevation view of the apparatus of FIG. 1 as seen in the plane of the arrows 3—3 of FIG. 1.
Figure 4:
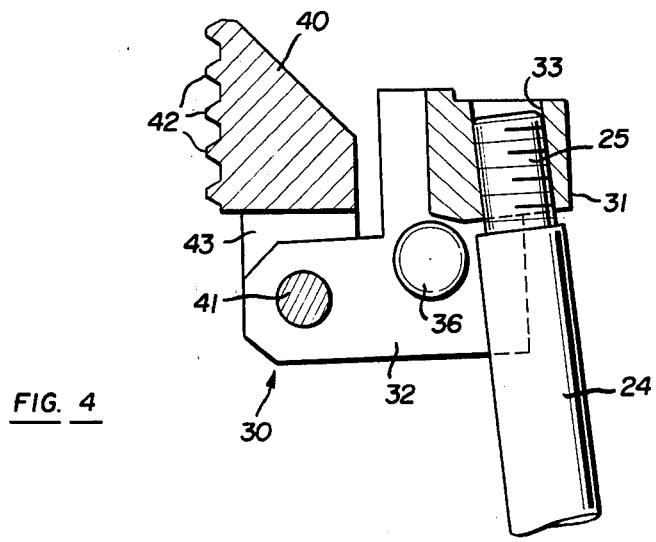
FIG. 4 is an enlarged sectional view of the apparatus of the present invention as seen along the plane of arrows 4—4 of FIG. 2.

In the drawings, reference numeral 10 refers generally to the tail pulling apparatus of the present invention for cleanly and completely removing the tail from an extruded tubular parison. The apparatus of the present invention is utilized with a conventional blow mold including laterally openable and closable opposed blow mold sections 11 and 12 defining an interior cavity 13 therebetween. The blow mold sections 11 and 12 are laterally closable upon a freely extruded tubular parison 14, and upon such closure, the parison 14 is pinched shut at one axial end to define a tail portion 15. As illustrated in FIG. 1, the tail 15 is formed along a first vertical plane.

Blow mold section 11 carries with it two downwardly extending brackets 16 and 17, and blow mold section 12 carries with it two downwardly extending brackets 18 and 19. These four brackets move laterally with the blow mold sections and support the tail pulling apparatus of the present invention.

A first cylinder 20 is mounted on a trunnion 21 at the end of brackets 16 and 17 opposed from the blow mold cavity 13. A second cylinder 22 is mounted on a trunnion 23 at the end of brackets 18 and 19 opposed from the blow mold cavity. Each cylinder, which may be hydraulic, includes an internal piston and an upwardly extending piston rod 24 having a threaded upper end 25.

The upper rod end 25 is threaded into a carrier head 30 which is generally L-shaped having a first leg 31 and a second leg 32 with a suitable threaded aperture 33 in leg 31 to receive the threaded end 25 of the piston rod.

A pair of links 35 connect each carrier head 30 to its respective brackets. Specifically, a first end of each link 35 is connected by a pin 36 to the center of the carrier head 30 intermediate the two legs 31 and 32. A second pin 37 connects the second end of the links to the brackets. The elongated central axis of each pin 36, 37 serves as an axis for pivotal motion parallel to the plane of the tail 15.

Mounted inwardly of each carrier head 30 is a tail gripping element 40 rotatably mounted on a pin 41 to the leg 32 of the carrier head. Gripper 40 has a plurality of serrations or teeth 42 on one surface for securely gripping the tail 15 therebetween and has an opposed base 43. The gripper is urged inwardly about pin 41 toward the plane of the tail 15 by a spring or other resilient or biasing means 44 mounted on the carrier head 30. At the bottom of the carrier head 30 there is a stop 45 which is positioned to contact the base 43 of the gripper to limit the inward pivotal movement of the gripper about the axis of pin 41. This stop, which may be a set screw, is adjustable laterally inwardly and outwardly.

The operation of the tail pulling apparatus of the present invention will now be explained. Initially, the blow mold sections and the tail pulling grippers are laterally spaced apart. The individual grippers 40 are pivoted inwardly about pin 41 under the influence of spring means 44 until the base 43 of each gripper contacts the adjustable stop 45 on the carrier head 30.

As the blow mold sections 11 and 12 are moved laterally inwardly to close upon a parison 14 and create a tail 15 along the vertical plane and exteriorly of the sections, the grippers 40 also move laterally inwardly to close upon the tail. The pressure of the two opposed grippers upon the tail 15 causes each gripper 40 to pivot outwardly slightly about the axis of pin 41 until each gripper is in a vertical position as illustrated in FIG. 1 with the base 43 of each gripper clear of the stop 45. The pressure of spring 44 keeps the teeth 42 of each gripper 40 in contact with the tail even though the tail may tend to shrink due to cooling.

In order to cleanly and completely separate the tail 15 from the parison 14, it is necessary to maintain the grippers 40 in contact with the tail 15 until the tail is completely severed from the parison. To accomplish this, I have discovered that it is necessary to prevent the grippers from moving laterally away from the plane of the tail 15 until the tail has been completely severed from the parison. Then, and only then, the grippers may be moved laterally outwardly from the plane of the tail to drop the tail clear of the grippers.

The novel coaction among the components of the tail puller apparatus which provides this desired movement of the grippers will now be explained. With the tail gripper elements closed on the tail, the inward end of each link is in a horizontal plane above the outer end of the link. That is, the end of the link through which pin 36 is inserted is axially closer to the blow mold cavity 13 than the opposite end which is connected by a pin 37 to the brackets. As each link 35 is pivoted about the axis of the pin 37, the end of the link which is laterally closer to the plane of the tail follows an over-center arcuate multi-stage path. The path initially curves inwardly toward the plane of the tail 15 and then crosses over-center, i.e., across a horizontal plane through pin 37, and finally outwardly away from the plane of the tail 15. The inward portion of the arcuate path in part insures that the grippers will not move away from the tail too quickly.

The tail gripper elements 40, however, do not necessarily move inwardly to the same extent as the end of the link because of the force of the opposed tail gripper element and the engaging of the tail therebetween. To accommodate the difference in inward movement between the link and the grippers, each gripper is resiliently pivotally biased toward the tail by the spring 44 with the adjustable stop 45 limiting the degree of pivotal movement. As the cylinders are actuated, the carrier heads 30 act as bell cranks and rotate outwardly about link pin 36. This increases the resilient force on each gripper to move the gripper laterally inwardly thus accommodating any shrinkage in the tail as it cools.

As the cylinders are actuated, the rods 24 pull down on the carrier head and rotate the head about the link pin 36. At the same time, the links 35 move along an over-center arcuate path as previously explained. This combined motion rotates the cylinders slightly outwardly away from the brackets on the trunnions 21. The force of spring means 44 increases the pressure on the grippers 40 as the carrier head rotates about link pin 36 and as the grippers move downwardly.

As the downward pull on rods 24 continues, the elongated axes of links 35 cross a horizontal plane, i.e., the inward end crosses over center, and then drops below the outward end of each link. The cylinders rotate inwardly about the trunnions 21 toward the brackets. The links 35 continue along their arcuate path about pin 37, and the carrier head 30 moves with the link 35 along an arcuate path which is both axially and laterally away from the parison. The tail grippers, having completed the first stage of their movement, now move through an arc having link pin 37 as the center. That is, the path of the gripper is now parallel to the path of the carrier head once the link 35 has crossed over-center. As the grippers 40 follow the arcuate path, they separate and permit the completely severed tail 15 to drop clear of the apparatus.

Figure 5:
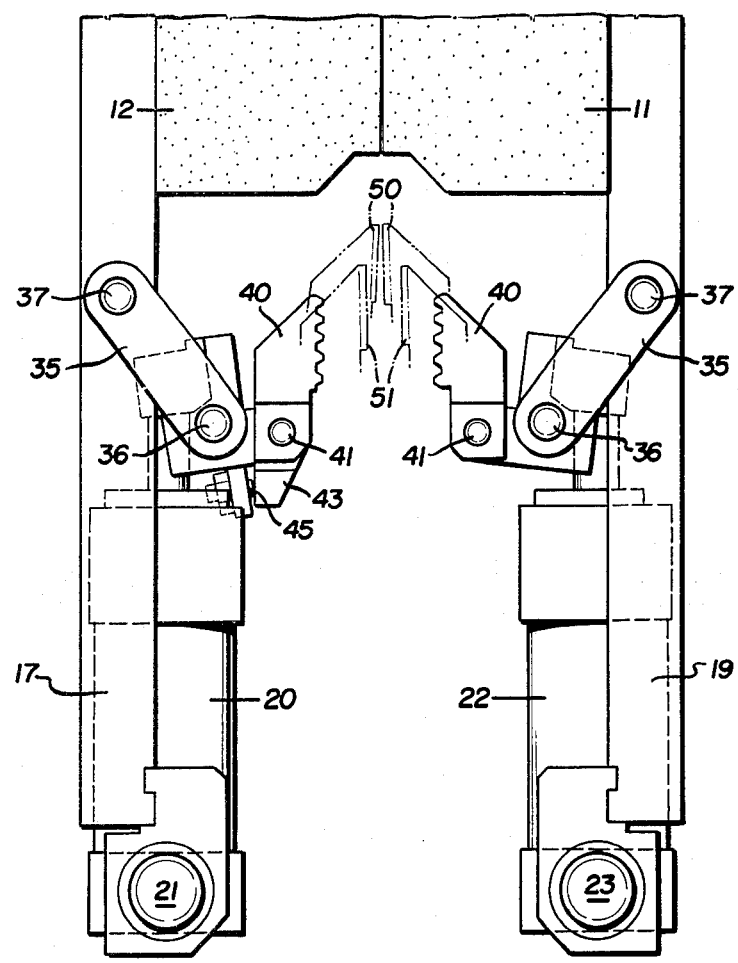
FIG. 5 is a front elevation view of the apparatus of the present invention after the tail has been completely severed and dropped.

In FIG. 5 the final position of the tail puller apparatus is illustrated showing the opposed tail grippers fully separated after the tail has dropped clear of the apparatus. Also illustrated in outline form in FIG. 5 are successive positions of the tail grippers during the first stage of motion, i.e., the pulling of the tail, as at 50 and during the second stage of motion, the arcuate portion of the path of the grippers 40, as at 51.

It must be appreciated that many variations may be made without departing from the spirit and scope of the present invention. The inventive concepts require that the tail gripping elements remain in constant contact with the tail until the tail has been completely severed from the parison even though the tail may be shrinking due to cooling and even though the tails in successive parisons may be of different thickness. Once the tail has been completed severed, then the motion of the opposed tail grippers drops the severed tail clear of the apparatus.

What is claimed is:

1. In an apparatus having opposed blow mold sections defining a blow mold cavity therebetween, the blow mold sections being closable to pinch shut a tubular parison located in a first plane to create a tail protruding exteriorly of said blow mold cavity and on one side of a pinch plane, the improvement comprising spaced tail pulling elements engaging said protruding tail therebetween, support means carried by said blow mold sections, respectively, and supporting said elements for closing movement with said sections, said support means including actuating means for moving said spaced tail pulling elements relative to said sections, and links pivotally interconnecting each of said tail pulling elements and said support means, said links being arcuately movable upon actuation of said actuating means to guide movement of said elements through a multiple stage path including (1) a first stage during which the elements move toward one another and away from said blow mold sections and (2) a second stage during which said elements move away from one another and away from said sections.

2. The invention as defined in claim 1 wherein said spaced tail pulling elements are resiliently urged toward said first plane to engage said tail on said first plane.

3. The invention as defined in claim 1 wherein said support means further includes a carrier rigidly mounted on said actuating means, wherein the links are pivotally interconnected to said carrier.

4. In a blow molding apparatus having opposed blow mold sections defining a blow mold cavity therebetween, the blow mold sections pinching shut a tubular parison positioned in a first plane to create a tail exteriorly of said blow mold cavity, the improvement of opposed tail pulling elements mounted respectively on said mold sections, resilient means urging said elements toward said first plane for engaging said tail on said first plane, and means for moving said tail pulling elements along a compound path away from said blow mold cavity, said path having a first portion during which said tail pulling elements move toward each other and away from said blow mold sections and a second portion during which said tail pulling elements move away from each other and away from the blow mold sections.

5. The invention as defined in claim 4 wherein said moving means includes a carrier pivotally connected to said tail pulling element, said resilient means mounted on said carrier, an actuator means for moving said carrier, and a link interconnecting one of said blow mold sections to said carrier, said link for guiding the tail pulling element along said compound path.

6. The invention as defined in claim 5 wherein said carrier includes a stop for limiting the pivotal motion of said tail pulling elements about said carrier caused by said resilient means.

7. In an apparatus having opposed blow mold sections defining a blow mold cavity therebetween, the blow mold sections being laterally closable to pinch shut a tubular parison located in a first plane to create a tail lying in said plane and projecting exteriorly of said blow mold cavity, the improvement comprising: actuating means carried by said blow mold sections, a carrier mounted on said actuating means for actuation thereby toward and away from said sections; spaced tail gripping elements pivotally mounted on said carrier and resiliently urged toward said first plane to engage the tail therebetween; and means mounting said carrier and guiding said carrier and said tail grippers through a composite path having a first portion during which the grippers move toward each other and away from the blow mold sections and a second portion during which the grippers move away from each other and away from the sections.

8. The invention as described in claim 7 wherein said carrier includes a stop to limit the pivotal motion of said grippers occasioned by the resilient urging of said carrier, said resilient mounting and said stop for accommodating the composite path of said grippers.

9. In a blow mold apparatus including laterally movable blow mold sections defining a cavity therebetween, said sections for pinching shut a tubular parison along a first plane to create a tail exteriorly of the cavity, the improvement comprising: opposed tail gripping elements resiliently mounted on respective blow mold sections and urged toward said first plane for engaging the tail therebetween, actuating means pivotally mounted on said blow mold sections for guiding said gripper elements through a compound path when said actuating means are actuated, said path having a first portion during which the gripper elements move toward each other and away from said blow mold sections and a second portion during which said gripper elements move away from each other and away from the blow mold sections.

* * * * *